United States Patent [19]

Skov

[11] Patent Number: 5,736,041
[45] Date of Patent: Apr. 7, 1998

[54] FILTER ELEMENT

[75] Inventor: Martin Skov, WalddorfhasLach, Germany

[73] Assignee: Moldex-Metric, Inc, Culver City, Calif.

[21] Appl. No.: 761,446

[22] Filed: Dec. 6, 1996

Related U.S. Application Data

[63] Continuation of Ser. No. 355,916, Dec. 14, 1994, abandoned.

[30] Foreign Application Priority Data

Dec. 16, 1993 [DE] Germany .................. 93 19 372 U

[51] Int. Cl.⁶ .................................................. B01D 27/08
[52] U.S. Cl. ...................... 210/445; 210/455; 210/493.1; 55/500; 55/527; 55/DIG. 33; 55/DIG. 35; 425/406; 425/510; 264/160; 264/345; 264/DIG. 48; 156/228
[58] Field of Search .............. 55/497, 500, 502, 55/503, 521, 527, DIG. 33, DIG. 35; 210/445, 446, 451, 455, 493.1, 493.5; 425/510, 406; 264/160, 345, DIG. 48; 156/155, 228

[56] References Cited

U.S. PATENT DOCUMENTS

| | | | |
|---|---|---|---|
| 4,636,231 | 1/1987 | Thornton et al. | 55/318 |
| 4,678,578 | 7/1987 | Nodes et al. | 210/445 |
| 4,798,676 | 1/1989 | Matkovich | 210/446 |

*Primary Examiner*—W. L. Walker
*Attorney, Agent, or Firm*—Charles H. Schwartz

[57] ABSTRACT

A filter element for use in a filter holder having a sealing surface and method of making a filter. The filter being made of a folded material of manufacture having a circumferential sealing rim and having a spacer to keep open the folded areas. The spaced being formed by at least one cover layer folded with the filter. The sealing rim being formed to be received in the sealing surface and with the folds formed by at least one cover layer and the filter material both along and transverse to the folds around the circumference of the at least one cover layer and filter material being pressed into said sealing rim at a temperature above the softening temperature of at least a thermoplastic resin provided in at least one of the layers of the cover and filter material.

31 Claims, 2 Drawing Sheets

FILTER ELEMENT

This is a continuation of application Ser. No. 08/355,916, filed Dec. 14, 1994, now abandoned.

BACKGROUND OF THE INVENTION

1. Field of the Invention

The innovation relates to a filter element and more particularly to a filter element of the type using parallely folded filter material.

2. Background Information

Filter elements of such a type using parallely folded filter material are used as replaceable units for insertion in capsules or cartridges of respirator face pieces. These filter elements consist of a glass fiber fleece as the filter material which is arranged in parallel folds in the fashion of an accordion. In order to keep the folds open, i.e. to prevent the individual layers of the folds from lying one on top of the other during breathing, either thin beads of adhesive or wax which extend in a direction transverse to the folds are applied, with the adhesive materials penetrating into interspaces between the folds and keeping the folds open after having hardened, or the predetermined distance between the folds is fixed by a seam with a thick yarn or like measures.

The outer circumference of the filter element is then provided with a form-defining rim which is e.g. made by inserting the filter material, which is arranged and fixed in folds, into a cartridge and by inserting a wax layer between filter and cartridge in a centrifugal process. Apart from the fact that the known filter element is difficult to make and rather expensive, the folds of the filter element have sharp filter material bends at which the risk arises that the filter material is weakened or even destroyed by mechanical impact, whereby the filter element becomes useless.

Another filter element for respirator face pieces comprises a plurality of circular flat layers of filter material which are interconnected along their outer circumferences by the application of heat and pressure. A predetermined number of filter material layers respectively form the upper side and lower side of an envelope which surrounds an inner space provided with a spacer. The spacer may be in the form of a padding and has a relatively small flow resistance. The interior communicates with a breather tube of air-impermeable material which is detachably coupled with an adapter arranged on a molded mask body of a respirator face piece. Hence, air is sucked through the breather tube from the interior which is kept open by the spacer, and into which air is again sucked through the filter layers of the filter element. Hence, the known filter element cannot be inserted into a capsule in a direct manner. Moreover, the filter surface is relatively small.

U.S. Pat. No. 4,678,578 discloses a filter element which can replaceably be inserted into a filter housing. This filter element, however, is not used for respiratory face pieces with an intermittent suction, but in industrial filters for filtering continuous flows in the pharmaceutical, cosmetic, photographic, biochemical or other industries. This filter element includes a folded filter element whose folds are kept open by cover layers. Filter material, cover layer and optionally the envelopes have, however, to be embedded in a compact extruded or punched frame of a plastic material, which increases the costs of the filter element.

SUMMARY OF THE INVENTION

The object of the present innovation is thus to provide a filter element which is inexpensive and functions in a reliable manner.

On account of the innovative design of the present invention, folding of the filter material will no longer create sharp bends at which damage might occur. Moreover, the filter material proper is protected against such damage by the superimposed cover layers and the envelope. Another advantage is the very inexpensive production because the troublesome application of adhesive or the like is no longer necessary. Nevertheless, the folds of the filter material are kept open in an extremely efficient manner. The innovative filter element can be inserted immediately and directly and optionally without an intermediate layer of a sealing ring into the respirator face piece with its sealing rim which is sufficiently rigid due to the special manufacture and also sufficiently flexible for sealing purposes.

A filter element for a respirator face piece having a sealing recess, comprising, a planar, parallely folded, filter material, a spacer for keeping open the folds and, a form-defining outer rim, and wherein the spacer is formed by two cover layers, which cover the entire surface of the filter material on both sides thereof and are folded together with the filter material so that each cover layer contacts itself in neighboring folds, and that the form-defining rim is formed as a sealing rim for being inserted into the sealing recess and with the filter element formed by thermal pressing the cover layers and the filter material at a temperature above the softening temperature of at least a thermoplastic resin provided in the layers. In a particular embodiment, the cover layers are formed of an open net material.

An embodiment of the invention shall now be explained in more detail with reference to the drawings.

DESCRIPTION OF THE PREFERRED EMBODIMENT

Figure 1:
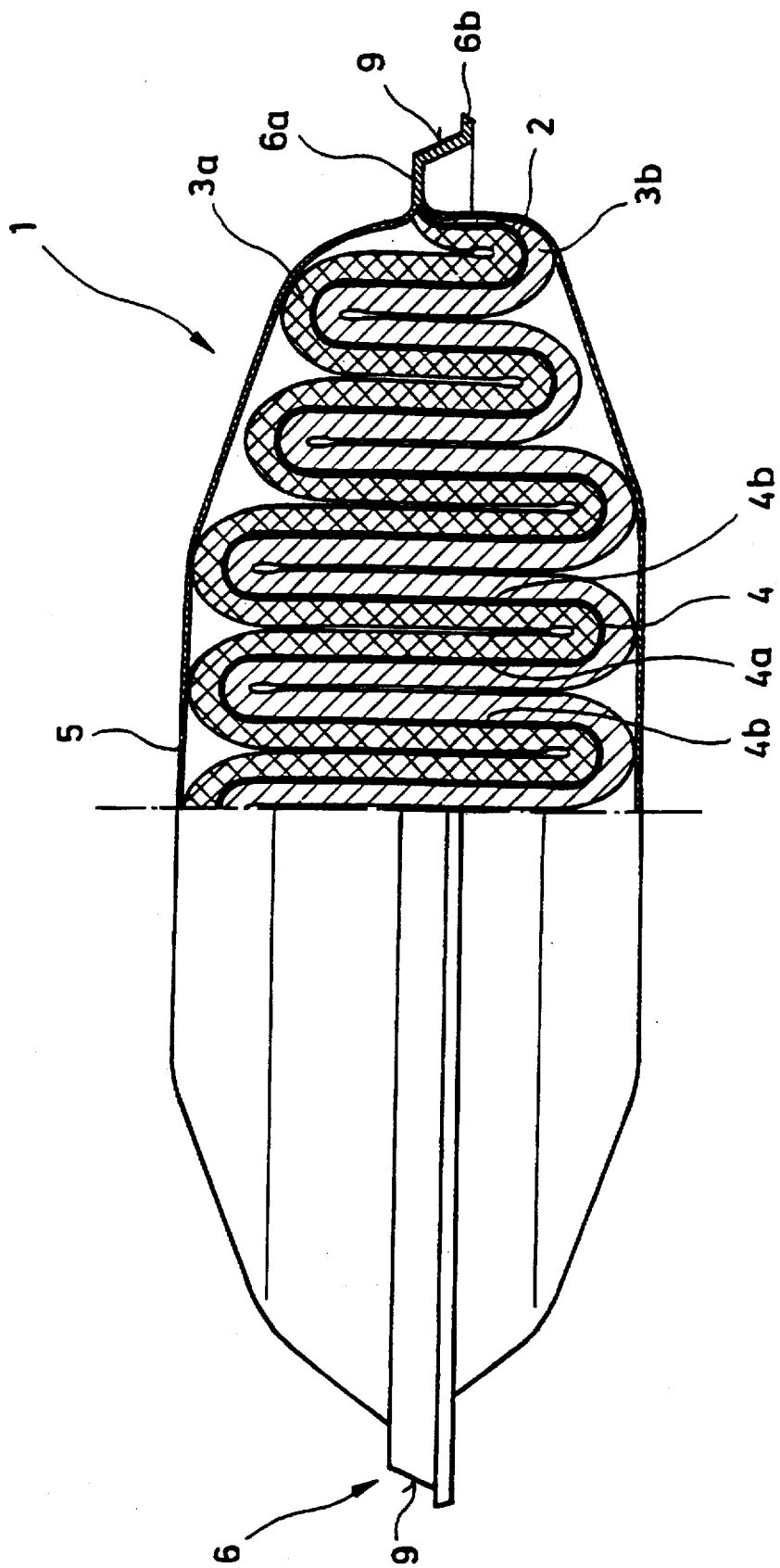
FIG. 1 is a partial sectional side view of a filter element of the invention.

FIG. 1 shows a filter element 1 which is circular when viewed from above and which has a lenticular cross-section and is designed for replaceable insertion into a cartridge or filter capsule of a respirator face piece, in particular a half mask. The filter element 1 has a planar filter material 2 which is drawn in an unbroken black line. The filter material 2 is covered at both sides by respective cover layers 3a and 3b, substantially over its whole surface. The filter material 2 and the cover layers 3a and 3b are then arranged in parallel folds 4 in the manner illustrated in FIG. 1 in the fashion of an accordion in such a way that the cover layers 3a and 3b are adjacent each other in neighboring folds 4.

The cover layers 3a and 3b act as spacers which keeps the neighboring and parallel portions 4a and 4b of the filter material 2 apart, i.e., at a distance which permits the unhindered entry of air onto the whole surface of the filter material 2. Moreover, the internal cover layer 3a and 3b respectively within every fold prevents the filter material 2 from terminating in the apex of fold 4 in a sharp bend. The folds 4 are thus smoothly rounded and loose, so that mechanical damage to the filter material 2 is largely prevented.

The unit of filter material 2 and cover layers 3a and 3b is surrounded by an envelope 5 which respectively consists of an upper circular material piece and a lower circular material piece.

The components of the filter element 1 are held together by a form-defining rim 6 in which the two material pieces of the envelope 5, the two cover layers 3a and 3b and the filter material 2 are firmly interconnected over the whole circumference of the filter element 1.

Figure 2:
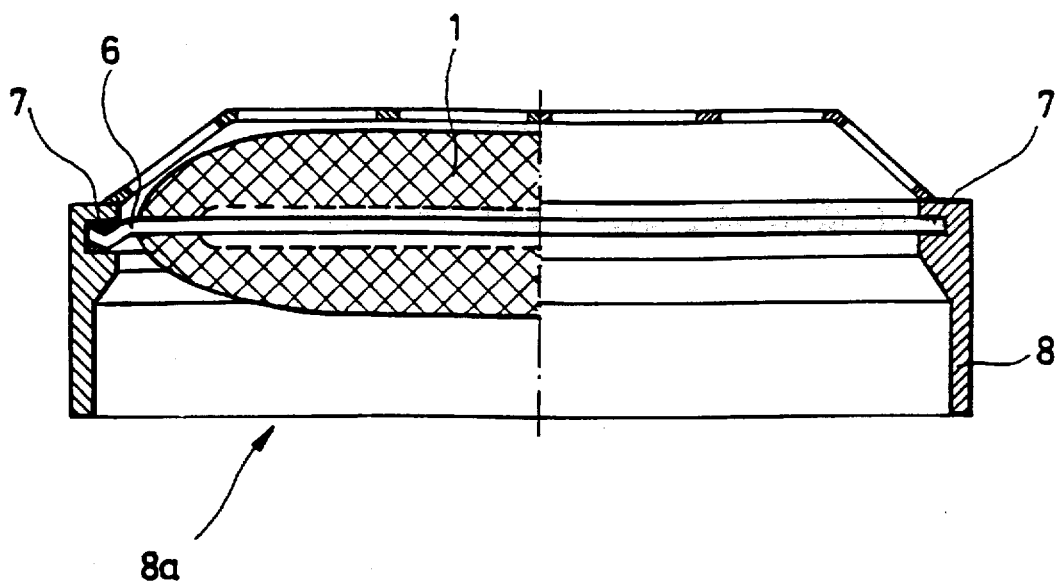
FIG. 2 shows the filter element of FIG. 1 when inserted into a capsule.

Rim 6 extends over the whole circumference and is designed as a sealing rim of sufficient width, strength and stiffness, so that, as can be seen in FIG. 2, it can be snapped or inserted into a receiving recess 7 of a cartridge or capsule 8 of rigid plastic or the like and effectively inhibits the passage of air across the receiving recess 7. Any additional measures for sealingly receiving a replaceable filter element will normally not become necessary owing to this design. It is, however, possible to additionally use sealing ring of foamed plastic or to additionally secure rim by bonding, in particular by heat sealing or ultrasonic welding, in capsule 8. The open side 8a of capsule 8 communicates either directly or via one of the known inhalation valves with the interior of the respirator face piece.

A melt-blown polypropylene fleece (MBPP) which is inserted in one or several layers is especially suited as a filter material. A wide-meshed thin net which is much more permeable and relatively thick in comparison with the filter material 2 is used for the cover layers 3a, 3b. The net which is used for the cover layers 3a, 3b consists expediently of polypropylene. A crimped fiber fleece of polypropylene fiber mixture may be used for envelope 5, which fiber fleece contains fibers of different fiber cross-sections and of different melting points, such as PP fibers having two different melting points or PP mixed with a melt fiber based on acryl or PVC. However, a plastic grid or the like may be used for the envelope 5.

If the rim 6 is to be used as a sealing rim, it must be of a uniform thickness. This is accomplished by molding rim 6 in a thermopressing operation in which it is ensured by a correspondingly high pressure and corresponding temperatures that rim 6 has a uniform thickness all around the filter element (in a direction transverse to or along the folds) despite different material amounts. At the same time, the distance between the filter folds is not changed owing to the relative stability of the cover layer nets, which guarantees excellent performance of the filter element.

To improve the stability of the sealing rim 6, the sealing rim 6 is provided with the embossment 9 shown in FIG. 1. Embossment 9 has the shape of a step which separates a first portion 6a of sealing rim 6 that is positioned in the center plane of filter element 1 from an off-center portion 6b, with the angle of slope of step 9 and the size of the off-center portion 6b being matched to the degree of the necessary stiffness of the sealing rim. The sealing rim 6 must be stiffer for a thin filter material and/or small folds than for a thicker filter material or higher folds in the case of which it might be enough to provide the step in a substantially vertical direction, and to dispense with the second portion 6b.

To manufacture the filter element, webs of the net for the cover layers and the necessary layers of filter material are first superimposed in the desired sequence. The filter material is subsequently arranged in folds of the desired height together with the web layers resting thereon at both sides. The size of the webs should expediently be chosen such that the width in the finish-folded state in a direction transverse to the folds corresponds approximately to the diameter of the finished filter element including sealing rim; the length, however, is several times said diameter, so that a plurality of filter elements can be obtained from each web.

The folded webs are subsequently supported in a direction transverse to the folds, so that the folds do not burst open, and are guided through a thermopressing tool, with a smooth layer of the material of the envelope being placed at both sides of the folded layers prior to the thermopressing operation, if desired. The plastic material is softened in the thermopressing tool in the area of sealing rim 6 at least to such an extent that upon the application of pressure and under compensation of different material amounts it can be pressed into a compact sealing rim which is stiffened by a step and of uniform thickness and width over its whole circumference. The filter element is subsequently either punched out or cut out, the future position of the step being defined by the position of the cut.

The novel filter element of the present invention in which the folds of the filter material are kept open by cover layers offers a greatly reduced breathing resistance in comparison with a filter material that has only been folded, and is thus much more comfortable for the wearer. The differences in breathing resistance are shown in Table 1.

TABLE 1

| | | | Distance given between the Folds | | | |
|---|---|---|---|---|---|---|
| Filter Material | Number of Layers | Shape | Filter Surface cm² | Test Surface cm² | Contact Flow Vol. l/min | Breathing Resist. PA |
| MBPP | 1 | Folds | 900 | 100 | 95 | 610 |
| MBPP + Cover | 1 | Folds | 900 | 100 | 95 | 77 |

"Number of layers" means the number of layers of the filter material in this table and in the following tables, "filter surface" means the active surface of the filter material and "test surface" is the cross-sectional surface of the filter element 1 in a top view on FIG. 1.

The degree of passage for harmful substances can be reduced by increasing the number of layers of the filter material. However, as shown in Table 2, the resistance increases in such a case.

TABLE 2

| | | Efficiency of a Filter Element, Folded with Cover Layers | | | | |
|---|---|---|---|---|---|---|
| Filter Material | Number of Layers | Filter Surface cm² | Test Surface cm² | Contact Flow Vol l/min | Breathing Resist. PA | Degree of Pass. NaCL % |
| MBPP + Cover | 1 | 900 | 100 | 95 | 77 | 0.63 |
| MBPP + Cover | 2 | 900 | 100 | 95 | 148 | 0.06 |
| MBPP + Cover | 3 | 900 | 100 | 95 | 258 | 0.002 |

It has been found that it is of great importance to the design of the filter element to determine the combinational ratio between the height and the number of folds for achieving maximum efficiency. When the filter surface is increased by increasing the height or the number of folds, the performance of the filter element deteriorates from a specific combinational magnitude onwards. This will become clearly apparent in the following Tables 3 and 4 through the increase in resistance at the same deposition performance.

TABLE 3

| Test | Contact | Breathing | Degree |

| Number of Folds | Height of Folds | Surface cm² | Flow Vol. l/min | Resistance PA | of Passage NACL % |
|---|---|---|---|---|---|
| 5 | 3.5 cm | 50 | 47.5 | 235 | 0.01 |
| 10 | 3.5 cm | 50 | 47.5 | 346 | 0.002 |
| 15 | 3.5 cm | 50 | 47.5 | 768 | 0.002 |

TABLE 4

| Number of Folds | Height of Folds | Test Surface cm² | Contact Flow Vol. l/min | Breathing Resistance PA | Degree of Passage NACL % |
|---|---|---|---|---|---|
| 5 | 2.5 cm | 50 | 47.5 | 195 | 0.03 |
| 10 | 2.5 cm | 50 | 47.5 | 260 | 0.002 |
| 15 | 2.5 cm | 50 | 47.5 | 380 | 0.002 |

In a modification of the embodiment depicted and illustrated above, the filter element may also be shaped in different ways. The reinforcement on the sealing rim need not necessarily be a step, but may also be in the form of a bead, a circumferential rib or the like. With a corresponding material available in the area of the sealing rim, the latter may also be designed as a simple circumferential flange. Instead of the webs for the cover layers, a crimped fiber fleece with a low breathing resistance may be used. Instead of polypropylene, other thermoplastic materials may be used. The filter material may also be chosen in response to the respective requirements.

Although the invention has been described with reference to a particular embodiment, it is to be appreciated that various adaptations and modifications may be made and the invention is only to be limited by the appended claims.

What is claimed is:

1. A filter element for use in a filter holder having a sealing surface, comprising:

a folded, filter material, a spacer for keeping open the folds and, a form-defining circumferential outer sealing rim, and wherein the spacer is formed by at least one cover layer, which covers the entire surface of the filter material on at least one side thereof and is folded together with the filter material so that the at least one cover layer spaces the folds of the filter material, and that the form-defining outer sealing rim is formed as a sealing rim for being inserted against the sealing surface of the filter holder and with the folds formed by the at least one cover layer and the filter material both along and traverse to the folds around the circumference of the at least one cover layer and filter material being pressed into said sealing rim at a temperature above the softening temperature of at least a thermoplastic resin provided in at least one of the layers of cover and filter material.

2. The filter element according in claim 1 wherein the folded combination of the at least one cover layer and filter material is provided with a further outer envelope.

3. The filter element according to claim 1, wherein the at least one cover layer consist of an open net material.

4. The filter element according to claim 1 wherein the filter material and the at least one cover layer consist of the same resin.

5. The filter element according to claim 1 wherein the filter material contains at least a melt-blown polypropylene fleece.

6. The filter element according to claim 1 wherein the at least one cover layer consist of polypropylene.

7. The filter element according to claim 2 wherein the envelope is a fiber fleece.

8. The filter element according to claim 7 wherein the envelope contains polypropylene fibers.

9. The filter element according to claim 1 wherein the sealing rim is form-stiffened.

10. The filter element according to claim 9 wherein the sealing rim comprises a form-stiffened, thermopressed embossing.

11. The filter element according to claim 10 wherein the embossing is formed by a bend in the sealing rim.

12. The filter element according to claim 9 wherein the sealing rim extends circularly.

13. The filter element according to claim 1 wherein the folded filter material is parallely folded planar material.

14. A filter element for use in a filter holder having a sealing surface, comprising:

a folded, filter material, and a form-defining circumferential outer sealing rim for being inserted against the sealing surface of the filter holder and with the folds of the filter material both along and transverse to the folds around the circumference of the filter material being pressed into said sealing rim at a temperature above the softening temperature of at least a thermoplastic resin provided in the filter material.

15. The filter element according to claim 14 wherein the folded filter material is parallely folded planar material.

16. The filter element according to claim 14 wherein the folded filter material is provided with an outer envelope.

17. The filter element according to claim 16 wherein the filter material contains at least a melt-blown polypropylene fleece.

18. The filter element according to claim 16 wherein the envelope is a fiber fleece.

19. The filter element according to claim 18 wherein the envelope contains polypropylene fibers.

20. The filter element according to claim 14 wherein the sealing rim is form-stiffened.

21. The filter element according to claim 14 wherein the sealing rim comprises a form-stiffened, thermopressed embossing.

22. The filter element according to claim 21 wherein the embossing is formed by a bend in the sealing rim.

23. The filter element according to claim 14 wherein the sealing rim extends circularly.

24. A method of making a filter element including a folded thermoplastic filter material, a spacer formed of at least one net cover layer for keeping the folds of the filter material open, and a form-defining circumferential outer sealing rim for insertion against a sealing surface of a filter holder, said method comprising:

superimposing webs of said filter material and of said at least one net cover layer, the width of said webs being chosen so that the width of the finish-folded state in a direction transverse to the folds corresponds approximately to the diameter of the finished filter element including said sealing rim, and the length of said webs being at least as great as said diameter;

arranging said filter material in folds together with said at least one net cover layer;

supporting the folded webs in a direction transverse to the folds and guiding said folded webs through a thermopressing tool;

actuating said thermopressing tool to soften and apply pressure to the plastic material of the folded filter material and said at least one net cover layer to thermally press said folds along and transverse to said folds around the circumference of the at least one cover layer and filter material to form said rim; and separating said filter element from said webs.

25. The method according to claim 24, wherein said filter element has a cover layer on each side of said filter element and wherein said superimposing step includes superimposing webs of said net cover layer on each side of said web of filter material, said arranging step arranges said filter material in folds together with both said webs of said net cover layer, and wherein said actuating step thermally presses the folded filter material and both said net cover layers to form said rim.

26. The method according to claim 24, wherein the length of said webs is several times said diameter, whereby a plurality of filter elements can be obtained from each set of superimposed webs.

27. The method according to claim 24, wherein subsequent to said step of arranging said filter element and cover layer in folds, envelope layers are superimposed above and below said folded webs, said envelope layers extending to the location of said rim of the finished filter element, and wherein said actuating step thermally presses said envelope layers along with said folds around said circumference, whereby said filter material, said at least one cover layer and said envelope layers are interconnected in said rim.

28. A filter element as made by the method of claim 24.

29. A filter element as made by the method of claim 25.

30. A filter element as made by the method of claim 26.

31. A filter element as made by the method of claim 27.

* * * * *